Jan. 17, 1956 R. PELHAT 2,731,000
COMPOUND INTERNAL-COMBUSTION ENGINE
Filed April 2, 1951 8 Sheets-Sheet 2
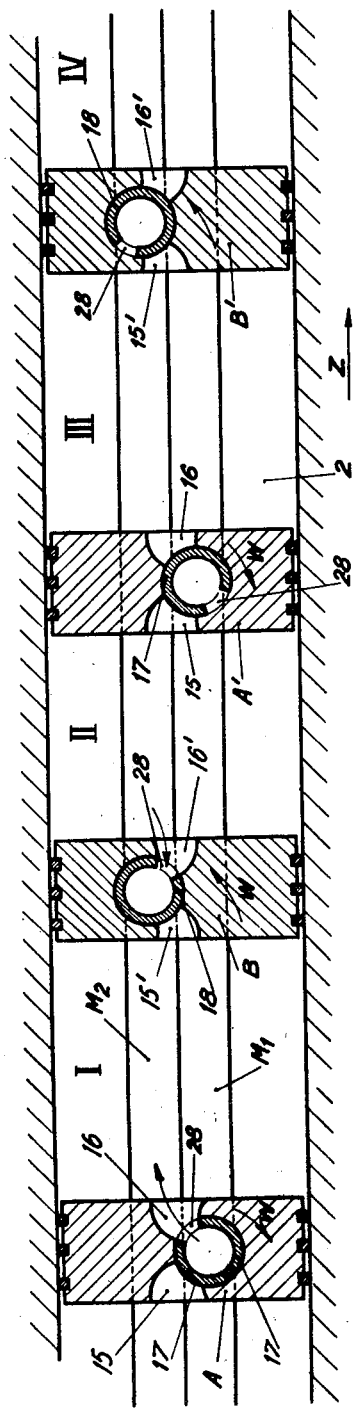
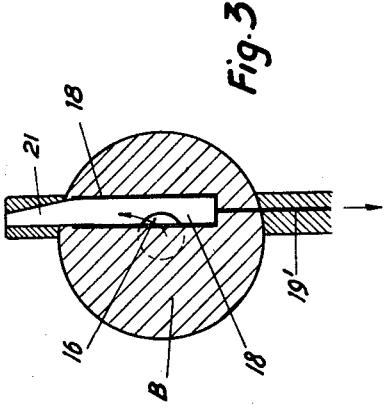
Fig.3
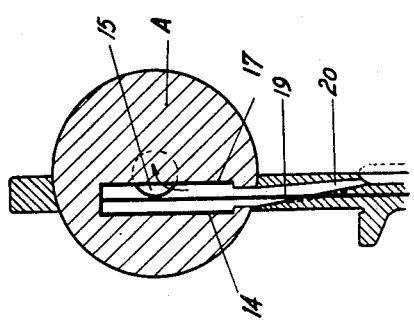
Fig.2
Fig.4
Inventor:
Raymond Pelhat
by J. Delattre-Seguy
Attorney

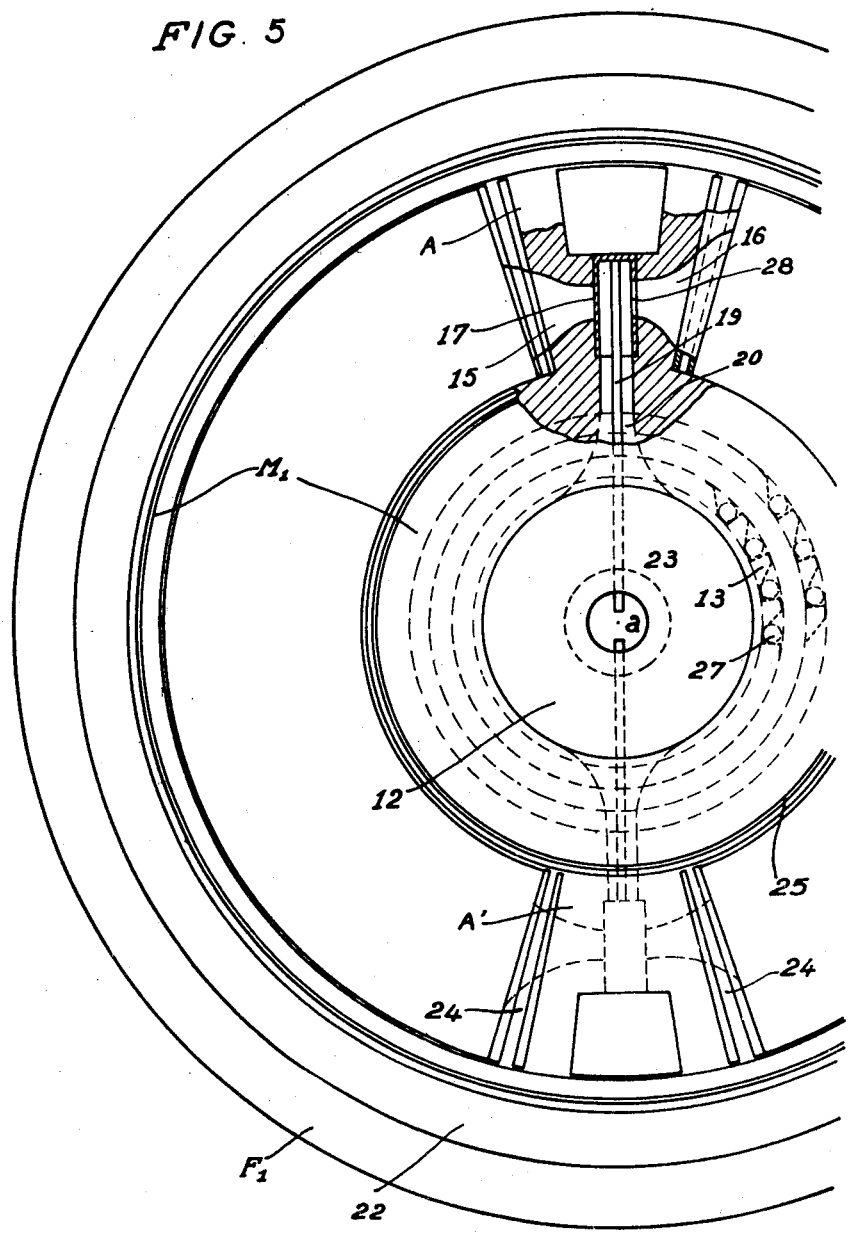

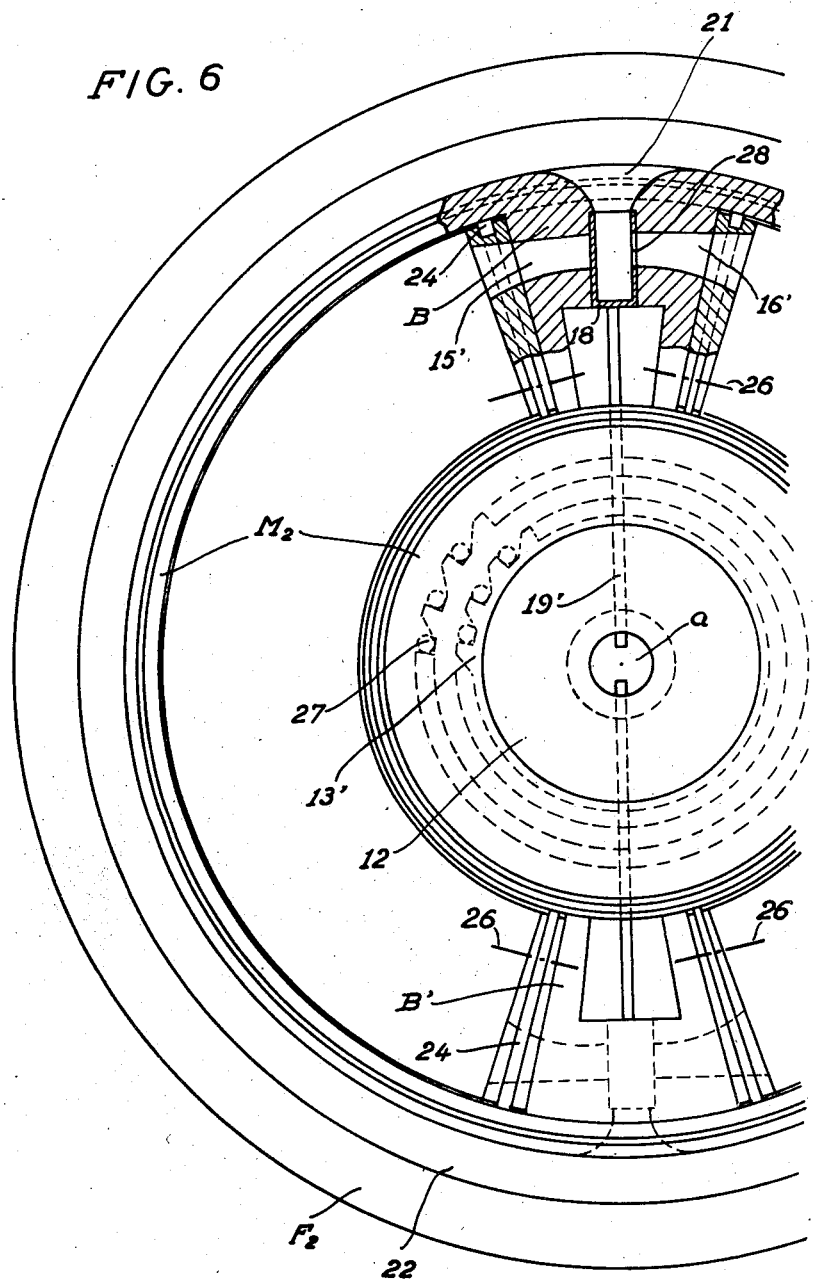

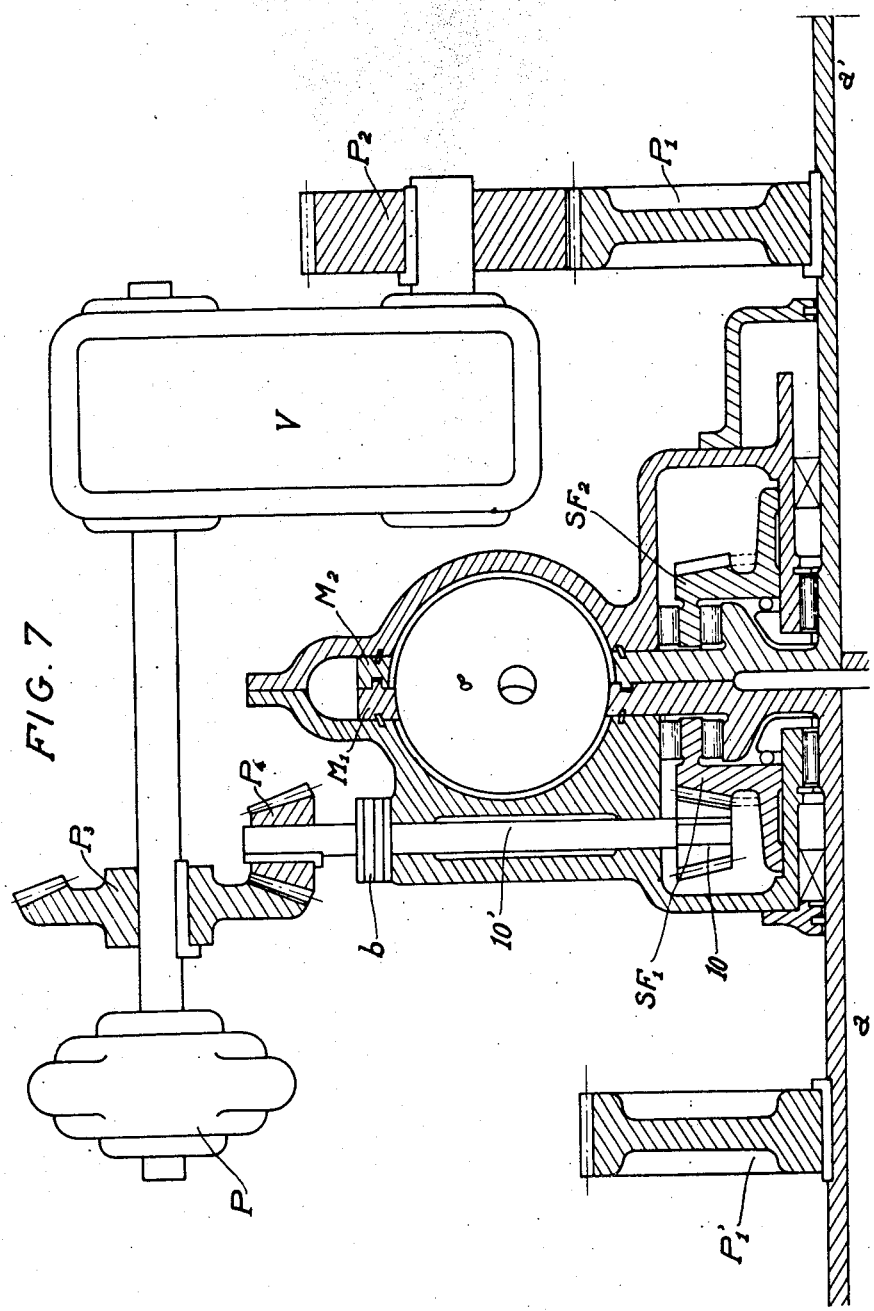

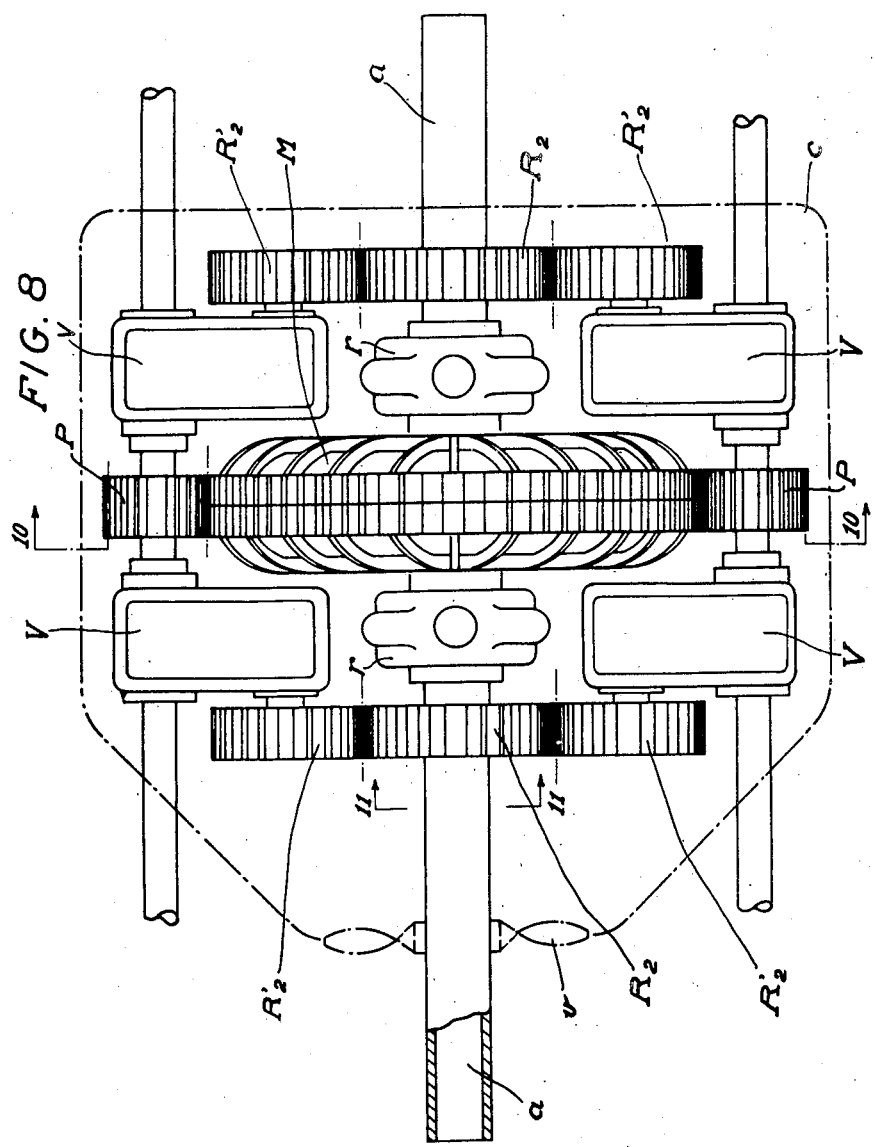

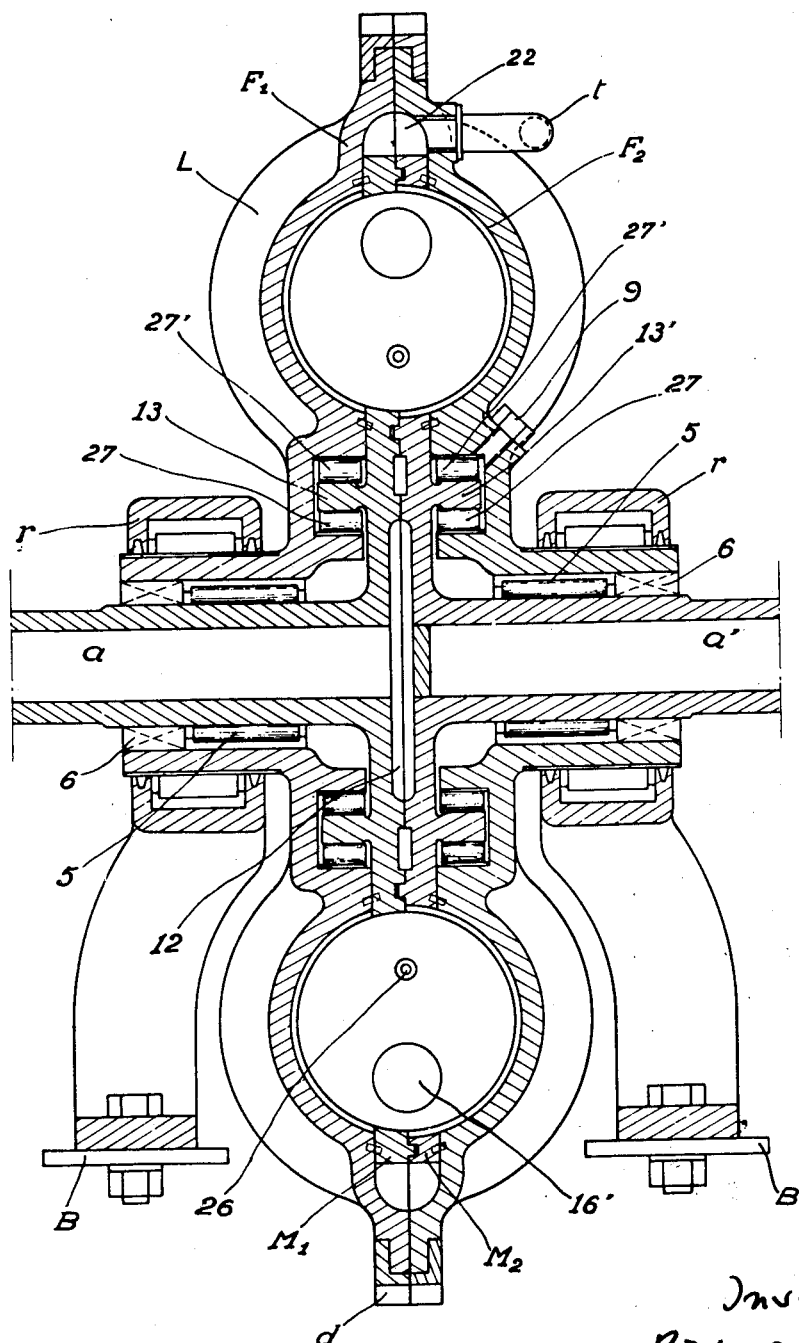

Jan. 17, 1956  R. PELHAT  2,731,000
COMPOUND INTERNAL-COMBUSTION ENGINE
Filed April 2, 1951  8 Sheets-Sheet 8
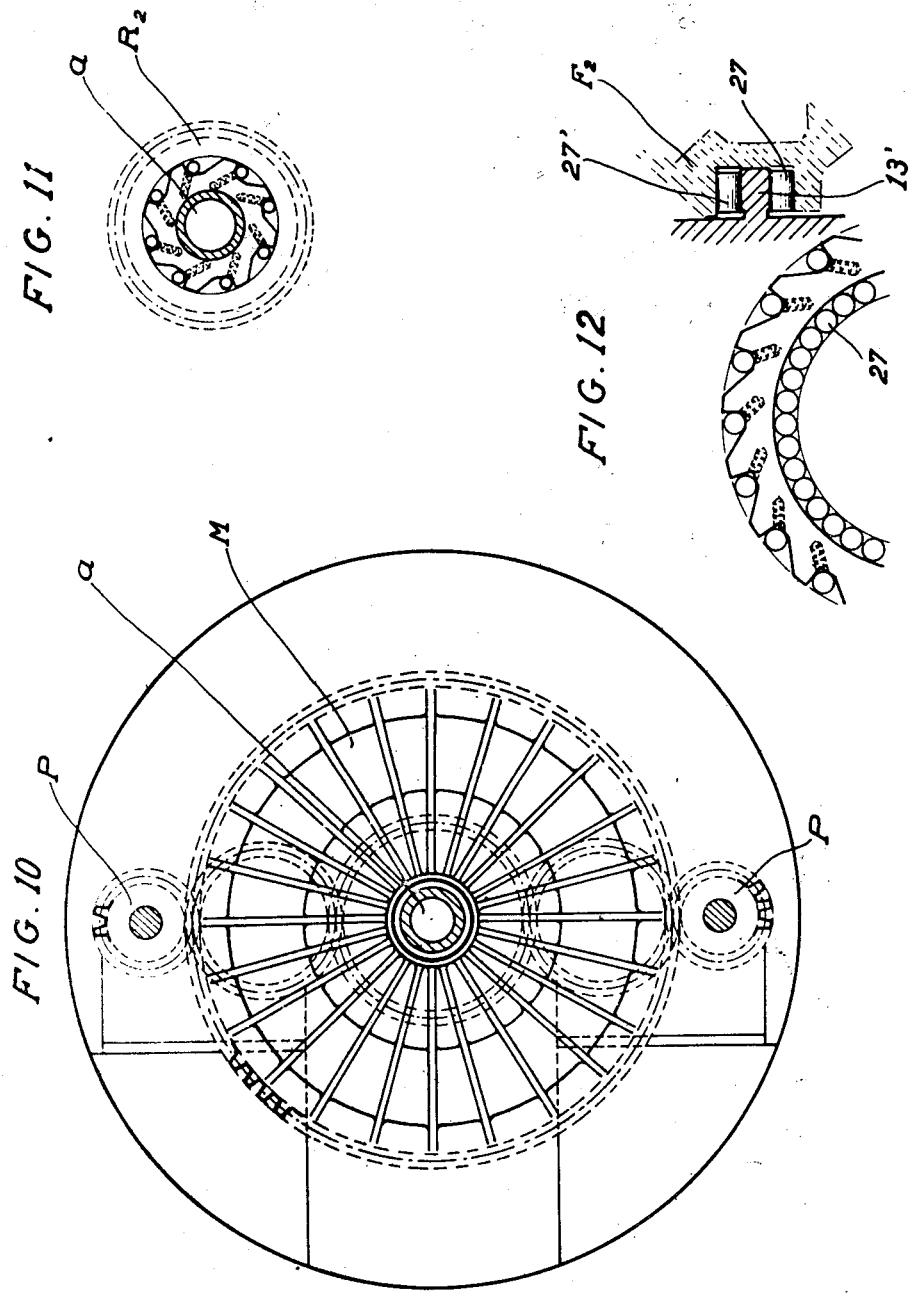
Inventor:
Raymond Pelhat
by J. Delater-Segny
Attorney United States Patent Office 2,731,000
Patented Jan. 17, 1956

2,731,000

COMPOUND INTERNAL-COMBUSTION ENGINE

Raymond Pelhat, Asnieres, France

Application April 2, 1951, Serial No. 218,715

Claims priority, application France April 1, 1950

2 Claims. (Cl. 123—11)

My invention has for its object improvements in the rotary combustion engines and it covers more particularly a centrifugal arrangement adapted to transform into mechanical energy the energy produced through the combustion of a carburetted mixture, said arrangement being characterized by the rotation of an even number of pistons, of which one half is carried by one disc-shaped member and the other by a second disc-shaped member, each disc being rigid with one of two hollow shafts lying in alignment with one another and adapted to revolve with reference to one another in a single direction and cooperating with a semi-stationary follow-up member. The pistons are adapted to revolve inside a volume of revolution that is preferably torus-shaped and partitioned by the pistons to form a plurality of fluidtight chambers in which the operative cycle of a four-stroke engine is performed as controlled through the agency of rotary valves housed inside each piston, and submitted to the action of a timing device adapted to control the admission and the exhaust of a carburetted mixture introduced through one of the two hollow shafts.

According to a further feature of the invention, the pistons are located two by two at the ends of a common diameter, the couples of pistons being carried alternatingly by the two disc-shaped members.

According to a preferred embodiment of the arrangement according to the invention, the frictional surface engagement between the two disc-shaped members is shaped so as to form a very flat chamber whereby it is possible, by reason of its rapid rotation to ensure an increased pressure for the carburetted mixture, when it is admitted through centrifugal projection towards the outer end of said flat chamber.

According to a further feature of the invention, the valves associated with the pistons carried by one of the disc-shaped members control the admission of fuel while those associated with the pistons on the other disc-shaped member that are shifted angularly with reference to the former control the exhaust.

Further features falling also within the scope of the invention will appear in the reading of the following description of an embodiment of the power unit according to my said invention, reference being made to accompanying drawings, wherein:

Fig. 2 is a longitudinal cross-section on a larger scale of an admission valve.

Fig. 3 is a cross-sectional view of an exhaust valve and Fig. 4 is a diagrammatic view from above of the operative cylinder in a developed view, showing the partitioning of said cylinder and the location of the admission and exhaust controlling valves.

Fig. 5 shows partly in elevation and partly in cross section, along plane x—x' of Figure 1, the movable system M1, seen from the right, leftward on Figure 1;

Figure 6 shows partly in elevation and partly in cross section, along plane x—x' of Figure 1, the movable system M2, seen from the left, rightward on Figure 1;

Figure 7 shows the operative connection between the two disc-members in an engine with a stationary casing;

Figure 8 shows the operative connection between the two disc-members in an engine with a rotary casing;

Figure 9 shows a cross-section in elevation of the engine part M of Figure 8;

Figure 10 is a section along line 10—10 of Figure 8;

Figure 11 is a cross section along line 11—11 of Figure 8, illustrating the device connecting a gear R2 to its corresponding shaft;

Figure 12 illustrates diagrammatically in detail a section of the means controlling mobiles M1 and M2 as shown in Figure 9.

Figure 1:
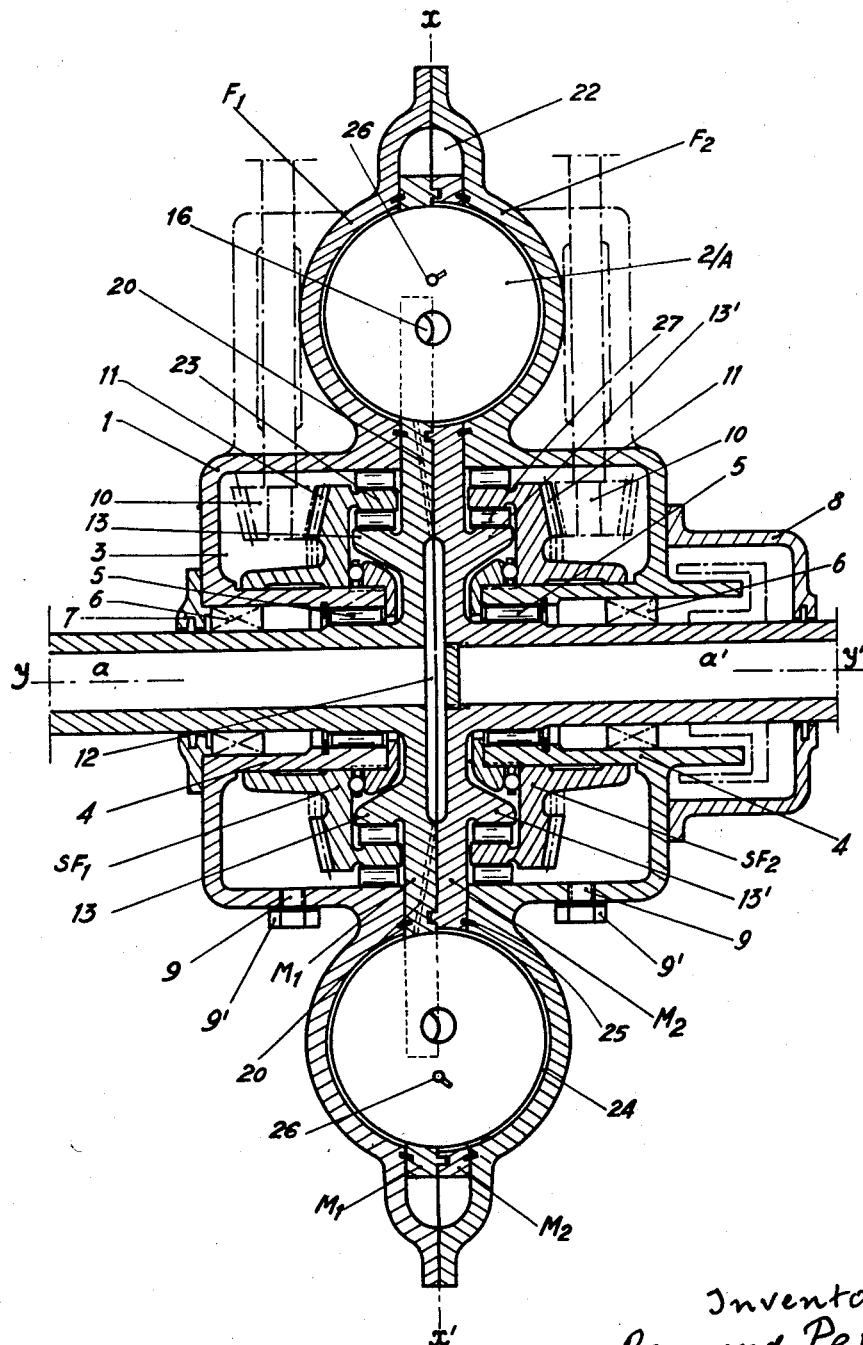
Fig. 1 is a sectional transverse view of an engine with four pistons.

As illustrated in Fig. 1, the engine according to the invention is constituted chiefly by a stationary casing 1 made of two parts F1 and F2 located to either side of a plane x—x' perpendicular to the plane of the drawing and forming a torus-shaped volume of revolution associated with a central case 3, inside which may revolve two semi-stationary parts SF1 and SF2 also located symmetrically with reference to the plane x—x' and the movable system including the two sections M1 and M2 also symmetrically located with reference to the plane x—x'.

The casing 1 is carried by a frame to which it is secured through a number of lugs, say four, and of securing bolts. The part of said casing forming the actual case 3 includes a socket 4 on each side of the engine that is inwardly and outwardly machined so as to form bearings for the semi-stationary S-F1 and S-F2 and for the movable sections M1—M2, the former parts SF1—SF2 being carried by rolls or rollers 5 on which they rotate round the tubular shafts a—a' rigid with the corresponding movable sections M1—M2.

Fluidtight packings 6 serve for holding the lubricating oil filling the case 3; a closing washer 7 on one side and a cover 8 on the other side serve for completely sealing the case 3 that is provided at its upper end with two openings not illustrated through which the oil is poured into it, said openings being similar to the oil draining openings 9 closed by screws 9' at its lower end.

The symmetrical semi-stationary parts SF1 and SF2 assume a generally annular shape and are each rigid with a bevel wheel shown at 11 that may mesh with a further bevel wheel 10.

The two bevel wheels 11 are allowed to rotate only in one direction as the rotation in the opposite sense is made impossible through the wedging of the balls or rollers on the stationary bearing of the case 3 against suitable slopes, an arrangement well known per se.

The movable system includes two sections M1 and M2 symmetrical with reference to the plane x—x' and adapted to rotate with reference to one another round the axis y—y', a very flat transverse space 12 being provided between the said sections to form a chamber submitted to increased pressure and communicating with the corresponding tubular extension perpendicular to the disc plane of the disc-shaped member and rigid therewith, said extensions forming the hollow shafts a—a'. The rotation of the shafts a—a' is ensured inside rollers 5 carried inside the socket 4 formed by the case 3.

The two disc-shaped members M1 and M2 include also an annular projection 13 or 13' forming a bearing for the rollers 27 through which said projections 13—13' carry the members SF1 and SF2. The torus-shaped chamber 2 formed by the stationary members is adapted to carry an even number of pistons as illustrated in the developed Fig. 4 wherein said pistons are supposed to be four in number and are shown at A—A'—B—B'. Said pistons are carried alternatingly by the corresponding disc-shaped member, thus the pistons A and A' are carried by the disc-shaped member M1 and the shaft a rigid therewith while B and B' are rigid with the disc-shaped member M2 and the shaft a'. The two diametrically opposed pistons A and A' as also the pistons B and B' are thus connected rigidly with one another and with the shaft a or a' as the case may be. They can be driven into rotation round the axis y—y' only in a single direction by reason of the well known arrangement of the type used already for locking the semi-stationary parts SF1 and SF2 against rearward rotation; this may be provided by rolls or rollers wedging the latter parts against rotation in one direction the allowed direction being the same for the members SF1 and SF2. It should be noticed that each of the shafts a—a' is adapted to drive into rotation in the sole direction allowed the corresponding semi-stationary parts SF2 and SF1 through the agency of an outer gearwork that it not illustrated beyond the wheels 11.

The arrangement of the pistons inside the torus-shaped chamber forming a cylinder provides for the partitioning of the latter. The fluidtightness inside each chamber is obtained through piston rings 24 and 25. As illustrated in Figs. 2, 3 and 4, each of the pistons includes a cylindrical recess 14 that is transverse with reference to the piston and the axis of which is parallel to the plane x—x' while two transverse ports 15 and 16 are provided for the recesses in the pistons A—A' and two ports 15' and 16' are provided for the recesses in the pistons B and B', the direction of said openings being such that they communicate with the corresponding chambers of the torus-shaped cylinder through the medial part of the pistons.

The pistons A and A' are located at the two ends of a same diameter of the disc-shaped member M and M' and the pistons B and B' are carried similarly by the disc-shaped member M2.

Inside the cylindrical bore 14 are housed cylindrical rotary valves 17 or 18 each provided with a port 28 adapted to cover or uncover the ports provided in the pistons and mentioned hereinabove with the references 15—16, 15'—16'. In Fig. 4, are shown respectively the valves 17 for the pistons A and A' and the valves 18 for the pistons B and B' and said valves are controlled by the rods 19—19' the rotation of which provides for the covering or uncovering of the ports 15 and 16 or 15' and 16' as the case may be and this leads to a gradual progression of the cycle throughout the four successive chambers I, II, III, IV (Fig. 4). The rotation of the control rods 19—19' is controlled by the shafts A and A' through the agency of any suitable arrangement not illustrated and including rods extending into the shafts and controlled through rods arranged longitudinally of the latter.

The carburetted mixture under pressure is caused to flow from the flat chamber 12 into the admission ports 17 through a pipe 20. The exhaust from the valves 18 is provided through pipes 21 opening into the annular peripheral chamber 22 provided in the outer stationary casing 1 (Fig. 1) opening in its turn into one or more exhaust pipes.

Lastly, one or two ignition devices 26 is or are provided in each chamber (Fig. 1). This arrangement includes the usual current breaker not illustrated.

The above disclosed engine operates in the manner illustrated in Fig. 4.

The carburetted mixture may be introduced into either of the shafts a or a'. In the example illustrated, it is fed through the hollow shaft a into the flat chamber 12 inside which it is submitted to pressure during normal operation through the action of centrifugal force. It is urged thence through the pipe 20 towards the valves 17.

The successive operations occurring in the different chambers are as follows, starting for instance from expansion inside the chamber III.

The pistons B and B' rigid with each other move in the direction of the arrow Z and the pistons A and A' are caused to move in a manner such that the corresponding variations in volume of the different chambers correspond to the following stages of operation in each of them:

Chamber II—exhaust
Chamber I—suction
Chamber IV—compression

The location of the valves in Fig. 4 corresponds to these stages. The next cycle will obviously be as follows:

Chamber II—suction
Chamber I—compression
Chamber IV—explosion the chamber III taken as a reference being the seat of the exhaust stage.

It is sufficient to make all the valves progress by one quarter of a revolution in the direction of the arrows W to shift this timing of the different cylinder chambers from one chamber to the next.

The four stroke cycle is provided in succession in each chamber and the valves are urged forwardly by one quarter of a revolution in the corresponding direction of rotation when the pistons move towards or away from one another to a maximum extent.

The rotary movement of the valves is bound with the breaking of the primary ignition circuit adapted to produce the desired spark.

Now, during normal operation, the shafts a—a' control through a translation gear the transmission in the desired direction of the semi-stationary parts SF2 and SF1. These latter parts, the angular movement of which is slower than that of the pistons, provide for the angular follow up of the movable parts M1—M2 with reference to one another, allow thus a speed reduction of a suitable value corresponding to the power to be obtained for a predetermined speed under substantially equal conditions of fuel consumption. It is possible for instance in accordance with the speed reduction adopted to provide four explosions per revolution or only one explosion for several revolutions.

Figure 7 illustrates how one of the disc members is operatively connected with the other disc-member, with particular reference to the alternative described in which the casing is stationary. In this structure, shaft a' entrains gears $p_1$ and $p_2$ which in turn entrain bevel gear $p_3$ through a speed controller V and gear $p_3$ gears onto gear $p_4$, which, through spindle 10', entrains conical gear 10, which controls the rotation of semi-stationary piece SF1. Similarly, a gear $p'_1$ revolving with shaft a transmits the motion of shaft a to semi-stationary piece SF2 through connections, not shown, forming the counterpart of those described with respect of shaft a' and piece SF1.

It should be noticed that although in the example illustrated the engine includes only four pistons, it will in practice be constituted somewhat after the manner of a turbine the blades of which are constituted by the pistons the number of which is then equal to 2n, 16 for instance, distributed by reason of 8 on each disc-shaped member which means four pistons A, four pistons A', four pistons B and four pistons B' which ensures the partitioning of the torus-shaped cylinder into sixteen chambers in each of which is executed the normal four-stroke cycle.

It will be readily understood that the arrangement according to the invention is equivalent to a system including a change speed gear and internal combustion engine as it is possible for a predetermined power, to make the speed vary in one direction and the torque in the opposite direction.

The arrangement according to my invention shows technical advantages among which should be mentioned the execution of a four stroke cycle through the rotation of a shaft, without any mechanical transmission such as a connecting rod or a crank arm.

The embodiment disclosed allows providing for the increase in pressure of the carburetted mixture before actual operation.

The large number of the combustion chambers also provides for an increase in the power of the engine.

In brief, it should be considered that the intermediary semi-stationary member SF1 or SF2 is held between two systems of ratchet wheels the outer one of which bears on the corresponding stationary part while the inner ratchet wheel 27 separates the SF1 and SF2 members from the corresponding piston-carrying discs. Turning to Fig. 4, it is apparent that if an explosion or driving stroke occurs in say compartment 1, the expansion of the gases will drive the piston B forwards by reason of the rear piston A being locked against rearward progression by the associated ratchet wheel. The explosion produces a forward step of the B—B' pistons and therewith of the corresponding shaft $a'$ in the case considered. The latter in its turn controls, through a pinion on its axis and a transmission gear, including possibly a change speed gear, the spindle shown in dot-and-dash lines controlling the bevel pinion 11 on the opposite side of Fig. 1. This will cause SF1 to rotate in the direction of allowed rotation and this will in its turn provide for an equal forward movement of pistons A and A' by reason of the fact that the ratchet locks the members M1 and SF1 together for such a movement. Of course, the operation is the same for compartment II for instance except that the right hand side now operates in the manner just disclosed for the left hand side. The odd and even pistons are thus shifted alternatingly and stepwise while producing a follow-up movement of the unshifted pistons.

In a modification, the intermediary members SF1 and SF2 may be cut out and the rotary piston-carrying discs engage directly the outer two-part casing member each through a single ratchet wheel or the like; in this case, this outer casing is revoluble with reference to it so as to be shifted in the same follow-up manner as was the case in the preceding embodiment of the semi-stationary members SF1 or SF2. Here again the odd pistons produce a relative follow-up movement of the even pistons and reversely. In this alternative of an engine with a rotary casing, as shown in Figures 8 to 12, a motor M meshes with gears $p$ pinned or otherwise fixedly latched to the secondary shafts of four reversible speed controllers V. On the primary shaft of each of said four speed controllers V, there is pinned a gear $R'_2$ which meshes with gear $R_2$ on the corresponding shaft $a$ or $a'$; each of the gears $R_2$ is mounted on corresponding shaft $a$ or $a'$ through a free wheeling device as illustrated in Figure 11.

With reference to the alternative in which the casing is rotary, the transmission operates as follows: if, at a given instant, shaft $a$ has received an impulse due to an expansion, shaft $a'$ will have an angular speed lower than that of shaft $a$. The impulse communicated to shaft $a$ at the time of the explosion is transmitted through gears R2, R2' of speed controller V, through gear $p$ to the toothed rotary casing M, which in turn entrains, by the action of ratchet wheel 27' on ramp 13' (Figures 9 and 12) shaft $a'$ which rotates with an angular speed lower than that of shaft $a$. On the next engine stroke, it is shaft $a'$ which receives the impulse and rotates at an angular speed higher than that of shaft $a$, and the impulse received by shaft $a'$ is communicated to shaft $a$ through transmissions which are the counter-part of those just described.

It may be mentioned also that the valve rods 19 that project radially into the corresponding hollow shaft, by reason of their being eccentric with reference to the corresponding pistons (see Figs. 2 and 3), are preferably controlled through a bevel gear and a control rod extending axially of the shaft considered and adapted to make the valves rotate by one quarter of a revolution at the end of each stroke so as to cover and uncover the ports in the valves in a properly timed sequence.

What I claim is:

1. A variable speed rotary internal combustion engine comprising: an annular torus-shaped cylinder having a central axis of revolution and a plane of symmetry transverse to said axis; a plurality of pairs of movable pistons located in said cylinder and adapted to revolve therein; each of said pairs comprising two pistons diametrically disposed with respect to each other; said plurality forming two sets of said pairs, each of said sets being angularly movable with respect to the other; the pistons in said two sets alternating in sequence and forming substantially gas-tight compartments in said cylinder; two rotary, piston carrying disc-members radially disposed with respect to said cylinder and having adjacent radial surfaces on said plane of symmetry; said disc-members being adapted to be angularly shifted with respect of one another and of said cylinder around said central axis; each of said disc-members being rigid with one of said sets of pairs of pistons; a first hollow shaft rigid with one of said disc-members and coaxial with said central axis; a second hollow shaft rigid with the other one of said disc-members, separate from said first shaft and coaxial with said central axis; means for feeding fuel into said compartments and means for exhausting the spent gas from said compartments in proper time sequence; at least one ignition means located directly on each of said pistons and being movable therewith; two separate sets of clutching means respectively engaging said disc-members and adapted to cause said disc-members to rotate only in one direction with respect of said cylinder; and transmission gears respectively connecting operatively each shaft with the set of clutching means which engages the disc-member rigid with the other shaft to constrain the last-named disc member to follow the motion of the other disc-member at a reduced speed.

2. An engine as claimed in claim 1, in which said clutching means comprise: an intermediary semi-stationary member fitted between each piston-carrying disc-member and its corresponding half of the torus shaped cylinder, and ratchet-wheel members inserted between each said semi-stationary member and the cooperating disc-member, and between each said semi-stationary member and said cylinder.

References Cited in the file of this patent

UNITED STATES PATENTS

| | | |
|---|---|---|
| 880,614 | Wright et al. | Mar. 4, 1908 |
| 1,790,534 | Chevallier et al. | Jan. 27, 1931 |
| 1,793,875 | Staaf | Feb. 24, 1931 |
| 1,839,275 | Sweningson | Jan. 5, 1932 |
| 1,981,615 | Enderlin | Nov. 20, 1934 |
| 2,280,967 | Nelson | Apr. 28, 1942 |
| 2,304,406 | Griffith | Dec. 8, 1942 |
| 2,318,514 | Miller | May 4, 1943 |
| 2,376,792 | Lynch | May 22, 1945 |
| 2,620,778 | Duckworth | Dec. 9, 1952 |

FOREIGN PATENTS

| | | |
|---|---|---|
| 387,261 | France | May 2, 1908 |
| 458,693 | France | Oct. 16, 1913 |